United States Patent Office 3,443,220
Patented May 6, 1969

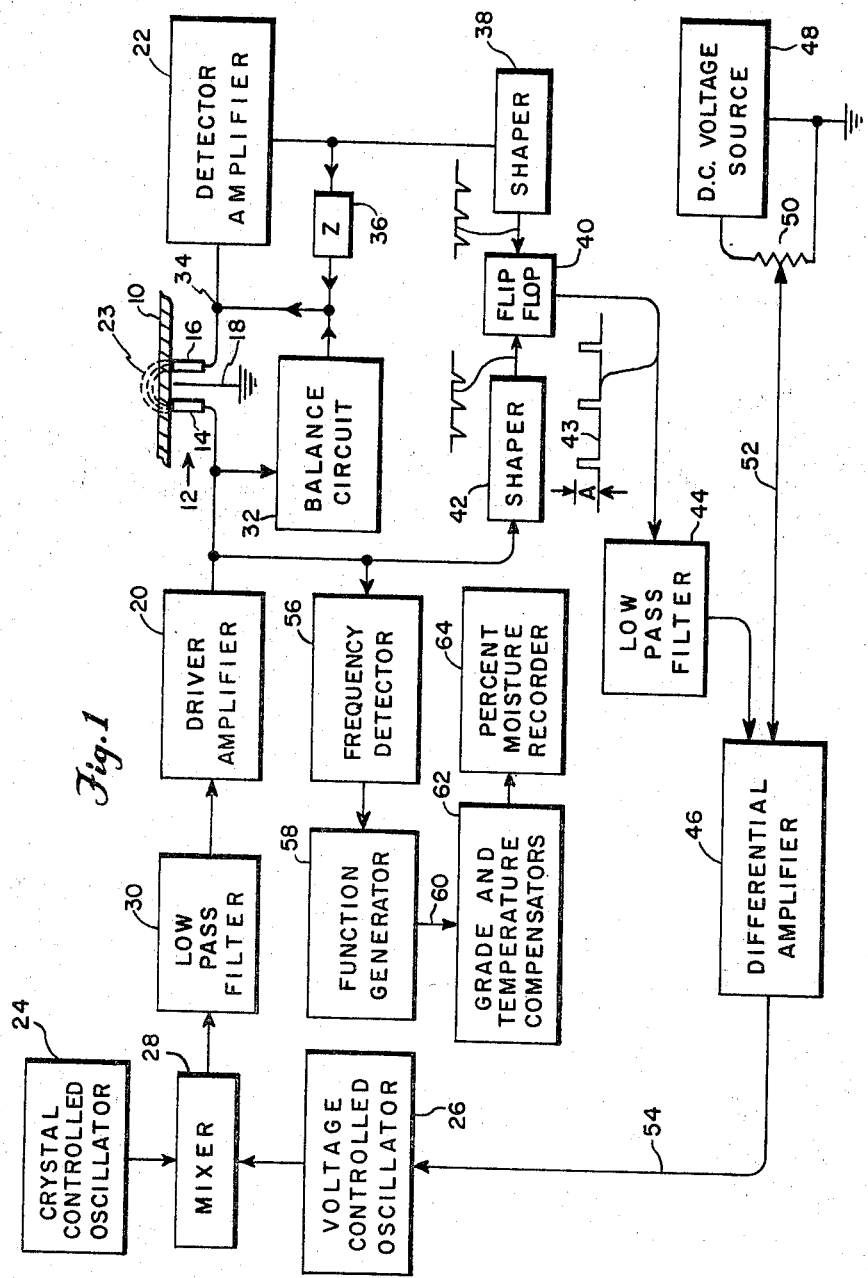

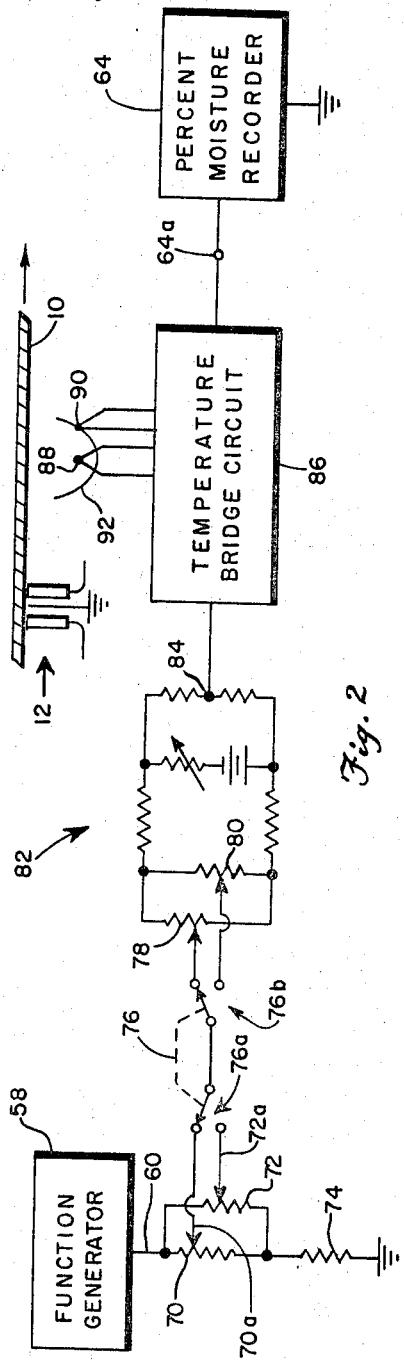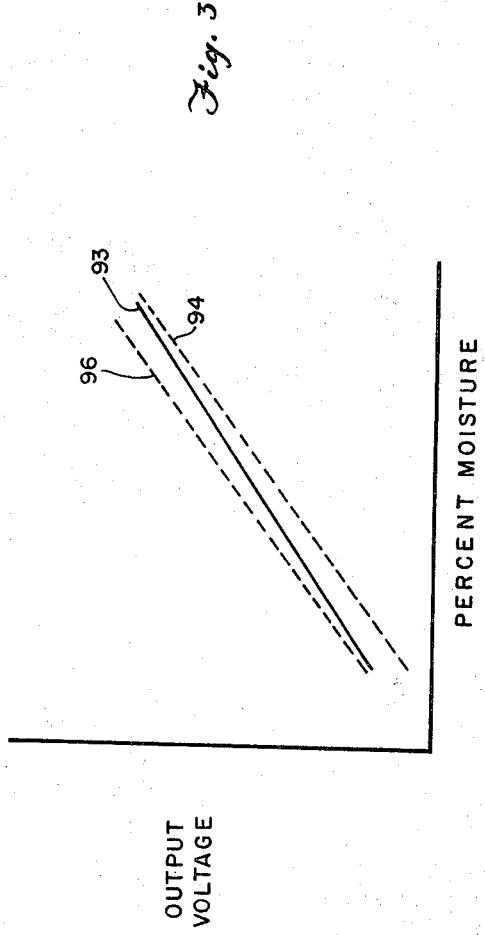

3,443,220
DIELECTRIC MATERIALS GAUGING SYSTEM WITH INPUT SIGNAL FREQUENCY AUTOMATICALLY VARIABLE IN RESPONSE TO A VARIATION FROM A SELECTED PHASE SHIFT IN THE DETECTED SIGNAL
Charles F. Spademan, Worthington, Ohio, assignor to Industrial Nucleonics Corporation, a corporation of Ohio
Filed July 7, 1966, Ser. No. 563,609
Int. Cl. G01r 27/26
U.S. Cl. 324—61                    13 Claims

ABSTRACT OF THE DISCLOSURE

Specifically disclosed is a method and apparatus for measuring a variable property (such as percentage moisture content) of a dielectric material (such as a traveling paper sheet) using a "capacitance" probe having spaced electrodes energized with a radiofrequency voltage of adjustable frequency. A phase measuring device whose operation is substantially independent of the frequency essentially measures the phase angle between the applied radiofreqency voltage and the complex current through the probe to provide a phase indicators signal. A reference signal source provides an adjustable reference signal indicative of a selected optimum phase angle. The measured phase indicator signal is compared with the reference signal to derive an error signal which is fed back to control the frequency of the voltage applied to the probe so as to maintain the phase angle constant at the selected value. The instantaneous operating frequency provides the measure of the percentage moisture content.

---

This invention relates to a system for determining a variable property of a dielectric material, using a probe having spaced electrodes energized by an alternating current input signal and electrically coupled to the material. Generally it relates to a system in which phase-shift variations in the detected signals from the probe are counteracted by opposite phase-shift variations produced by automatically varying the frequency of the input signal, whereby the frequency may be correlated with the value of the measured property. More particularly it relates to a system in which a signal representing the phase shift of a detected signal from the probe is compared with a signal representing a selected value for the phase shift to derive an error signal which is fed back to control the frequency of the input signal.

While dielectric gauging apparatus according to the invention is adapted for quantitative measurement of at least one property of any one of a number of dielectric materials having appreciable conductivity in relation to their electric suscpetibility, the invention is particularly directed to a moisture gauge for measuring solid materials having a variable mass per unit length, area or volume. In this application a gauge according to the invention is adapted to provide an indication of percentage moisture content which is substantially independent of mass variations.

The present invention is an improvement on the apparatus which is described and claimed in copending application Ser. No. 563,487, filed July 7, 1966 by William L. Adams, and is directed to a new class of dielectric materials gauges referred to as constant-phase systems. In a constant-phase dielectric materials gauging system, a variable frequency alternating voltage source and a detector are electrically coupled to the material by means of a probe having spaced electrodes. The applied voltage from the source produces a complex current through the probe which is detected by the detector to provide a signal which has a phase shift dependent on a variable property of the material, such as its moisture content, which is to be measured. The phase shift is also dependent on the frequency of the source which provides the input voltage. By utilizing a form of negative feedback, the frequency of the input voltage source is continuously and automatically adjusted to maintain the phase shift of the detected signal substantially constant.

According to the present invention, I provide means such as a linear phase detector employing a binary switch or flip-flop arrangement for producing a phase-indicator signal indicative of the phase relationship between the detector output signal and a phase-reference signal. There is also provided means for producing a continuously variable phase-selector signal indicative of a selected phase relationship and means responsive to the two signals for continuously and instantaneously varying the frequency of the voltage source which energizes the probe. The frequency of this voltage source is convenienty derived from the difference frequency between the outputs of a crystal-controlled oscillator and a voltage-controlled oscilltaor, both operating at much higher frequencies then the frequency of the probe energizing voltage. The input voltage is thus capable of being varied over an extremely wide range including very low difference frequencies approaching zero frequency, using basic oscillators of conventional design. The preferred form of the invention also provides a simplified arrangement for providing a signal which varies in a linear fashion with the material property to be measured, so that suitable automatic correction can be made for changes in the temperature of the material and so that the calibration of the instrument can be readily adjusted for different material compositions to be measured.

The objects of this invention are to provide a dielectric materials gauging system having an improved and simplified arrangement for varying the frequency of the input voltage source to produce a phase shift in the detected signal which counteracts the phase shift of the detected signal produced by variations in the measured property of the material, to provide a system which does not require complex driving-oscillator and phase-demodulator arrangements, to provide such a system which is easily and automatically compensated for temperature changes which may occur in the measured material, to provide a system which is adapted to measure materials having different characteristics by simply changing from one instrument characteristic to another, and to provide such a system which includes a source of input voltage which is continuously and automatically variable over an extremely wide range including very low frequencies using simple and conventional oscillator design techniques.

Further objects and advantages of the present invention will become apparent in the following detailed description of one preferred embodiment of the invention, taken with reference to the appended drawings in which:

FIG. 1 is a schematic diagram of one form of a dielectric materials gauge according to the invention.

FIG. 2 is a schematic diagram showing in more detail a portion of the apparatus of FIG. 1.

FIG. 3 is a graph showing various relations between the moisture content of measured materials and the output voltage provided by an instrument according to the invention.

With reference to FIG. 1, the numeral 10 indicates a dielectric material having a variable property to be measured. It may be assumed that the material 10 is the output product of a continuous manufacturing process for forming the material in a continuous length which passes adjacent to a probe 12. Probe 12 comprises a pair of spaced electrodes 14 and 16, which are normally arranged on the same side of the traveling material 10 and with a grounded guard electrode 18 between the principal probe electrode 14 and 16. The electrodes are supported by a suitable mechanical structure (not shown) whereby the probe electrodes are maintained in physical contact with the material 10 using a light pressure so as to avoid physical damage to the material.

The probe 12 is energized with an alternating voltage supplied to the probe from the output of a driver amplifier 20. The probe is also connected to a detector amplifier 22. As illustrated, the probe electrode 14 is connected to the output of the driver amplifier 20 and the electrode 16 is connected to the input of the detector amplifier 22. As a result of the input voltage applied to the probe from driver amplifier 20, the probe is adapted to produce an electric field between the electrodes comprising electric fields lines 23 extending from one electrode to the other through the material 10. Thus the material 10 is electrically coupled to an input voltage source, comprising driver amplifier 20, and to a detector comprising amplifier 22.

The frequency of the input voltage supplied to the probe from driver amplifier 20 constitutes the difference between the frequency of a crystal-controlled oscillator 24 and a voltage-controlled oscillator 26. The outputs of oscillators 24 and 26 are fed into a mixer 28. The output of the mixer is fed to a low-pass filter 30 which passes the difference beat frequency between oscillators 24 and 26, while substantially eliminating the components of the signal at the frequencies of oscillators 24 and 26 as well as the upper sideband frequencies. The output of the low-pass filter is amplified by driver amplifier 20, which is adapted to produce a sinusoidal voltage for driving the probe 10. Typically, the oscillator 24 may operate at a frequency of about ten megacycles while the oscillator 26 is variable in frequency between about nine megacycles and ten megacycles. Thus by conventional voltage control of oscillator 26, the input of driver amplifier 20 is supplied with a signal which is accurately variable in frequency between a low audio frequency and a radio frequency of about one megacycle per second.

The output of driver amplifier 20 applies the energizing voltage to the probe 12 and also to a balance circuit 32. The current through the probe which is produced by this applied voltage causes a current to flow into a junction point 34 at the input of detector amplifier 22. Junction point 34 also receives a generally oppositely-directed current supplied by balance circuit 32. Junction 34 is further coupled to the output of the detector amplifier 22 through a feedback impedance 36.

This circuit is initially balanced by withdrawing the probe 12 from the vicinity of the measured material 10 and adjusting balancing circuit 32 so that the current supplied to the junction point 34 through balancing circuit 32 is exactly equal to and 180° out of phase with the current supplied to the junction point through probe 12. This balanced condition is indicated by zero output from detector amplifier 22. When the probe is again placed next to the material 10, the current through the probe exhibits an increase in amplitude and a change in phase, so that it is no longer equal and opposite to the current supplied through the balancing circuit 32. This tends to produce a change in potential at the junction point 34, resulting in an input signal to detector amplifier 22. As a result the amplifier instantaneously supplies through feedback impedance 36 a current which is equal and opposite to the difference between the current supplied through the probe and through the balancing circuit, so that the net current supplied to junction 34 is substantially zero, thus maintaining the junction point at substantially constant potential.

The voltage required to produce the summation current through feedback impedance 36 constitutes the output signal from the detector amplifier 22. This output signal is fed through suitable circuitry 38, herein referred to for convenience as a "shaper," to one input of a flip-flop 40. Another input of flip-flop 40 receives a signal from the output of driver amplifier 20 through a similar shaper 42. Shapers 38 and 42 may incorporate overdriven amplifiers wtih automatic input level control as well differentiating and clipping circuits to provide sharply defined triggering pulses occurring in response to corresponding portions on the slopes of the sinusoidal waveforms provided by amplifiers 20 and 22.

The pulses applied to flip-flop 40 from shaper 42 provide a phase-reference signal indicative of the phase of the input voltage applied to the probe 12. The phase of this voltage is independent of the electrical properties of material 10, and the pulses supplied to flip-flop 40 from shaper 42 are adapted to turn the flip-flop "on" at a predetermined instant during each cycle of the input voltage applied to the probe 12. Likewise the pulses supplied to the other input of flip-flop 40 from shaper 38 are adapted to turn the flip-flop "off" at a predetermined instant during each cycle of the output voltage waveform from detector amplifier 22. With respect to the input voltage applied to the probe, the output signal from detector amplifier 22 has a phase shift dependent on the complex dielectric constant of the portion of the material 10 which is subjected to the electric field of the probe 12. Accordingly, the time interval which occurs between the turning on of flip-flop 40 by the signal from shaper 42 and the turning off of the flip-flop by the signal from shaper 38 (as a fraction of the time interval occupied by one cycle of the input voltage applied to the probe) is indicative of the phase relationship between the detector output signal and the input signal applied to the probe.

Flip-flop 40 produces an output signal having the waveform indicated at 43. When the flip-flop is turned on, it provides an output voltage having a constant amplitude A. The output voltage from the flip-flop is thus on or off according to a time-sharing arrangement in which the signal is present part of the time and absent for the rest of the time. The fraction of the time during which the flip-flop is on and the output voltage is present is referred to as the "duty cycle" of the flip-flop. A duty cycle of ⅛, for example, when the signal is present for one-eighth of the time and absent for seven-eighths of the time, indicates that the phase shift between the signal which turns the flip-flop on and the signal which turns the flip-flop off is 45°.

The output of flip-flop 40 is fed to a low-pass filter 44, which integrates or averages the signal to provide at the output of the filter a smoothed D.C. voltage which is directly proportional to the phase shift of the current through the probe 12 with respect to the voltage applied thereto from driver amplifier 20. This D.C. phase-indicator signal, obtained from the low-pass filter, is applied to one input of a differential amplifier 46. Another input to the differential amplifier receives a further D.C. voltage derived from a voltage source 48. This voltage is adjustable, for example, by means of a potentiometer 50 across voltage source 48, to provide on line 52 a phase-selector signal which is indicative of a selected phase shift between the detector output signal and the voltage applied to the probe. The differential amplifier 46 amplifies the difference between the two voltages fed to its inputs to provide a control signal at its output on line 54 which is applied to the frequency control input of the voltage controlled oscillator 26.

The output of driver amplifier 20, which supplies the input voltage of the probe 12, is connected to the input of a frequency detector 56. The frequency detector provides a D.C. output voltage proportional to the frequency of the voltage applied to the probe. Since the operating frequency of the system varies in a logarithmic manner with variations in the measured property of the material 10, the output of the frequency detector 56 is fed to the input of a function generator 58. The function generator preferably comprises a conventional network of biased diodes, although a servomechanism employing a suitably padded slidewire feedback potentiometer may be used. The function generator is adapted to provide on output line 60 a voltage which varies linearly with the measured property of the material 10.

The output voltage from the function generator appearing on line 60 is processed by suitable circuitry indicated generally by the box 62 to provide appropriate compensation for the composition of the material being measured and for changes in its temperature. In the illustrative sample of the measurement of percentage moisture content in paper, various compositions of ingredients result in different "grades" of paper. Since a change from the manufacture of one grade of paper to another may result in a change in the dielectric qualities of the paper, the circuitry of box 62 incorporates a grade compensator arrangement. The compensated voltage output of box 62 is fed to a moisture recorder 64 which automatically and continuously records the percent moisture content. A signal from the moisture recorder, or more directly, a signal from box 62, may also be used by a suitable automatic control device for controlling the operation of the paper dryers so as to maintain the moisture content constant at a desired value.

In the operation of the system of FIG. 1 as a moisture gauge, an input voltage supplied from driver amplifier 20 energizes probe 12, and produces a complex current through the probe. This current has a phase shift, with respect to the applied voltage, which is dependent on the moisture content of the paper and is also dependent on the frequency of the applied voltage. The current through the probe is detected by detector amplifier 22 and converted to an amplified voltage waveform which is shaped and applied to flip-flop 40. In flip-flop 40, the phase relationship between the detected signal and the applied voltage, which is shaped by shaper 42, is converted to a train of constant amplitude pulses occurring at the frequency of the input voltage applied to the probe. The low-pass filter 44 converts these pulses to a signal indicative of phase-shift between the voltage applied to the probe and the current through the probe. Differential amplifier 46 amplifies the difference between the voltage from low-pass filter 44 and the voltage on line 52 from the phase-shift selector voltage source. The amplified output of the differential amplifier controls the frequency of oscillator 26.

Assume that the crystal-controlled oscillator 24 is operating at a frequency of 10 megacycles, and that for a given value of moisture content in the paper the voltage-controlled oscillator 26 is operating at a frequency of 9.9 megacycles. The difference frequency applied to the probe from driver amplifier 20 is then 100 kilocycles. If now the moisture content in the paper 10 increases by a certain amount, the feedback system will cause the voltage-controlled oscillator frequency to decrease to 9.8 megacycles. This will cause the voltage supplied to the probe 12 to increase in frequency to 200 kilocycles. The opposite situation of course occurs when the moisture content of the paper decreases.

An increase or decrease in the input voltage frequency detected by frequency detector 56 will result in a corresponding increase or decrease in the output voltage from the function generator, producing an appropriate change in the reading provided by moisture recorder 64.

One form of a suitable grade and temperature compensation arrangement is shown in FIG. 2. As aforesaid, the output of the function generator 58 is a D.C. voltage which varies linearly with the frequency of the voltage which energizes the probe. This voltage, which appears on line 60, is applied across a potentiometer arrangement comprising variable potentiometer units 70 and 72 and a fixed resistor 74. The variable taps 70a and 72a are connected to the fixed contacts of one section 76a of a ganged switch arrangement 76 having a further switch section 76b. The fixed contacts of switch section 76b are connected to the variable taps of a pair of potentiometer units 78 and 80 which are connected in a conventional bridge circuit 82. The bridge circuit is used as a variable voltage source adapted to provide a millivolt output with either positive or negative polarity. A common output terminal 84 of this bridge circuit is connected to a temperature bridge circuit 86. The temperature bridge circuit in turn is connected to the moisture recorder 64.

The temperature bridge circuit is part of a sheet temperature sensing device which includes a pair of thermistors 88 and 90 connected into the temperature bridge circuit. Thermistor 88 is mounted at the focal point of a parabolic reflector 92 which receives infrared radiation from a portion of the traveling paper sheet 10 at a point directly downstream of the probe 12. Thermistor 88 is thereby heated to a temperature according to the amount of infrared radiation emitted from the sheet, while thermistor 90 is used to compensate for the affects of ambient heat on the thermistor 88. The temperature bridge circuit 86 also constitutes a bidge circuit operating as a voltage source to provide a millivolt output of one D.C. polarity or the other when the actual temperature of the paper sheet 10 deviates above or below a selected nominal temperature.

The input signal applied to terminals 64a of the moisture recorder 64 is thus the sum of three voltages, one derived from the potentiometer network connected to line 60 at the output of function generator 58, second voltage derived from the bridge circuit 82, and a third voltage derived from the temperature bridge circuit 86.

FIG. 3 is a plot of the output voltage from the moisture gauging instrument of FIG. 1 as a function of the percent moisture in the paper. For purposes of example, the output voltage in FIG. 3 may be assumed to be the voltage applied to terminals 64a at the input of the moisture recorder 64.

As previously explained, the voltage obtained from the function generator 58 varies according to a linear function of the frequency. The voltage supplied to the moisture recorder, or other device which is to utilize the signal, should vary according to an optimum desired function such as that shown by the solid line 93 in FIG. 3. However, the voltage on line 60 at the output of the function generator, or an attenuated portion thereof as picked up by one of the potentiometer taps 70a or 72a, may vary according to a different linear function such as that shown by the dashed line 94.

It is apparent that in order to make the function 94 coincide with the function 93 it must be given a translational upward shift, say, to the position of the dashed line 96, and then have its slope decreased. The necessary change in the slope of the line can be effected by changing the point along the potentiometer string 70, 72 and 74 at which the function generator voltage is tapped off. The necessary vertical translation of the line can be effected by changing the amount of the constant increment of voltage that is added by means of the bridge circuit 82.

Thus the slope of the line is determined by the setting of the potentiometer unit 70 or 72, whichever is in use according to the position of switch 76. Likewise the vertical position of the line is determined by the setting of potentiometer unit 78 or 80, whichever is in use according to the position of the switch. A small, variable vertical translation of the calibration curve is automatically effected as required during the operation of the instrument by the addition of a variable voltage increment from the temperature bridge circuit 86, in accordance with a deviation in the temperature of the sheet. The grade switch 76 makes available a selection of two different slopes and two different vertical positions of the calibration curve for two different grades of paper. Obviously more grade switch settings can be made available by providing further switch contacts and further potentiometers. It is apparent also that equivalent grade switching provisions and/or other calibration provisions could be provided either in the function generator 58 or in the moisture recorder 64, using conventional techniques.

The range of moisture content, or other variable property which can be measured with a specific range of input frequencies available from the oscillator is determined by the selected value for the operating phase shift which is set by means of potentiometer 50, FIG. 1. If several discrete ranges are desired or necessary, a range selector switch system can be provided by duplicating potentiometer 50 and adding a switch, in the same manner as that illustrated by duplicate potentiometer units 70 and 72 and switch 76a of FIG. 2.

What is claimed is:

1. Apparatus for quantitative determination of a property of a dielectric material, comprising
    a source of an alternating input voltage,
    detecting means,
    a probe having spaced electrodes adapted for electrically coupling said voltage source and said detecting means to a portion of said material, thereby energizing said detecting means to produce a detector output signal as a result of said input voltage coupled to said material, said detector output signal having a phase dependent on the complex dielectric constant of said material portion,
    means energized by said input voltage source for producing a phase reference signal having a phase independent of the electrical properties of said material,
    means responsive to said detector output signal and said phase reference signal for producing a phase indicator signal indicative of the phase relationship therebetween,
    means for producing a phase selector signal indicative of a selected phase relationship between said detector output and phase reference signals,
    means responsive to said phase indicator and phase selector signals for producing a control signal,
    means utilizing said control signal to change the frequency of said alternating voltage in the direction which tends to restore said selected phase relationship between said detector output and said phase reference signals, and
    means for converting the frequency of said alternating voltage to a signal indicative of the value of said property of said dielectric material.

2. Apparatus as in claim 1 wherein said means for producing a phase indicator signal comprises
    means for producing a voltage waveform periodically recurring at the frequency of said input voltage,
    means for time-modulating said voltage waveform in accordance with the phase difference between said phase reference signal and said detector output signal, and
    means for averaging successive cycles of said periodically recurring voltage waveform to produce said phase indicator signal.

3. Apparatus as in claim 2 wherein said means for producing said periodically recurring voltage waveform includes
    means for maintaining said voltage waveform at a substantially constant amplitude substantially independent of the amplitudes of said phase reference and detector output signals.

4. Apparatus as in claim 1 wherein said means for producing a phase reference signal comprises
    a first wave shaper circuit coupled to said input voltage source for providing a first reference voltage waveform,
    and wherein said means for producing said phase indicator signal comprises
    a second wave shaper circuit receiving said detector output signal for producing a second voltage waveform substantially independent of the amplitude of said detector output signal,
    means controlled by said first and second voltage waveforms for producing a series of voltage pulses having a wave shape indicative of the phase difference between said first and second voltage waveforms, and
    means responsive to the magnitude of said voltage pulses for producing said phase indicator signal.

5. Apparatus as in claim 4 wherein said voltage pulse producing means comprises
    a binary circuit having a first stable state for producing and maintaining a voltage having a first amplitude level in response to said first voltage waveform produced by said first wave shaper circuit, said binary circuit also having a second stable state for producing and maintaining a voltage having a second amplitude level in response to said second voltage waveform produced by said second wave shaper circuit whereby the fraction of the time said binary circuit remains in one of said stable states provides a measure of the phase shift between said first and second voltage waveforms.

6. Apparatus as in claim 1 including
    means for converting the operating frequency of said alternating input voltage to a signal which is variable in a substantially linear manner with variations in said property of said dielectric material.

7. Apparatus as in claim 6 wherein said converting means includes
    means responsive to the temperature of said dielectric material for compensating said linearly variable signal for variations in said operating frequency caused by temperature changes in said material.

8. Apparatus as in claim 6 wherein said converting means comprises
    means responsive to said alternating input voltage for providing a signal proportional to the frequency thereof, and function generator for converting said frequency proportional signal to said signal which is linearly variable with changes in said property of said dielectric material.

9. Apparatus as in claim 1 wherein said alternating input voltage source comprises
    a fixed frequency oscillator,
    a variable frequency oscillator,
    a mixer circuit coupled to said fixed and variable frequency oscillators for providing a signal alternating at a frequency equal to the difference between the frequencies of said fixed and variable frequency oscillators, said difference frequency constituting the frequency of said alternating input voltage.

10. Apparatus as in claim 9 also comprising
    a low pass filter coupled to said mixer circuit for passing said signal at said difference frequency while substantially eliminating said fixed and variable oscillator frequencies and the upper sideband frequencies resulting from the addition thereof.

11. Apparatus as in claim 10 further comprising
    a driver amplifier receiving said difference frequency signal passed by said low pass filter for providing said alternating input voltage coupled to said probe.

12. Apparatus for quantitative determination of a property of a dielectric material, comprising
    a source of an alternating input voltage,
    detecting means,
    a probe having spaced electrodes adapted for electrically coupling said voltage source and said detecting means to a portion of said material, thereby energizing said detecting means to produce a detector output signal as a result of said input voltage coupled to said material, said detector output signal having a phase dependent on the complex dielectric constant of said material portion,
    means energized by said input voltage source for producing a phase reference signal having a phase independent of the electrical properties of said material, means responsive to said detector output and phase reference signals for producing a voltage waveform periodically recurring at the frequency of said input voltage and for time-modulating said voltage waveform in accordance with the phase difference between said phase reference signal and said detector output signal, means for averaging successive cycles of said periodically recurring voltage waveform to produce a phase indicator signal indicative of the phase relationship between said detector output signal and said phase reference signal, means for producing a phase selector signal indicative of a selected phase relationship between said detector output and said phase reference signals, means responsive to said phase indicator and phase selector signals for producing a control signal, means utilizing said control signal to change the frequency of said alternating voltage in the direction which tends to restore said selected phase relationship between said detector output and said phase reference signal, means responsive to said alternating input voltage for producing a signal which is a function of the frequency thereof, and a function generator for converting said frequency-functional signal to a signal which is variable in a substantially linear manner with variations in said property of said dielectric material.

13. In combination with an apparatus for measuring a dielectric material utilizing a probe having spaced electrodes electrically coupled to the material and energized by an alternating voltage to produce a complex current through said probe, and wherein changes in the phase of said current with respect to said voltage are counteracted by opposite phase changes produced by automatically varying the frequency of the voltage, the improvement which comprises means for producing a first signal which is a function of the phase of said current with respect to said voltage, selector means for producing a second signal indicative of a selected value for the phase of said current with respect to said voltage, means responsive to a difference between said first and second signals for changing the frequency of said voltage in the direction which tends to maintain said first signal equal to said second signal, and means for converting the frequency of said alternating voltage to a signal indicative of the value of said property of said dielectric material.

References Cited

UNITED STATES PATENTS

| | | | |
|---|---|---|---|
| 2,985,825 | 5/1961 | Whittier | 324—60 XR |
| 3,230,449 | 1/1966 | Kaiser | 324—60 |
| 3,292,077 | 12/1966 | Sloughter | 324—40 XR |

RUDOLPH V. ROLINEC, *Primary Examiner.*

E. E. KUBASIEWICZ, *Assistant Examiner.*